E. BALL.
Wagon.
No. 110,107.
Patented Dec. 13, 1870.
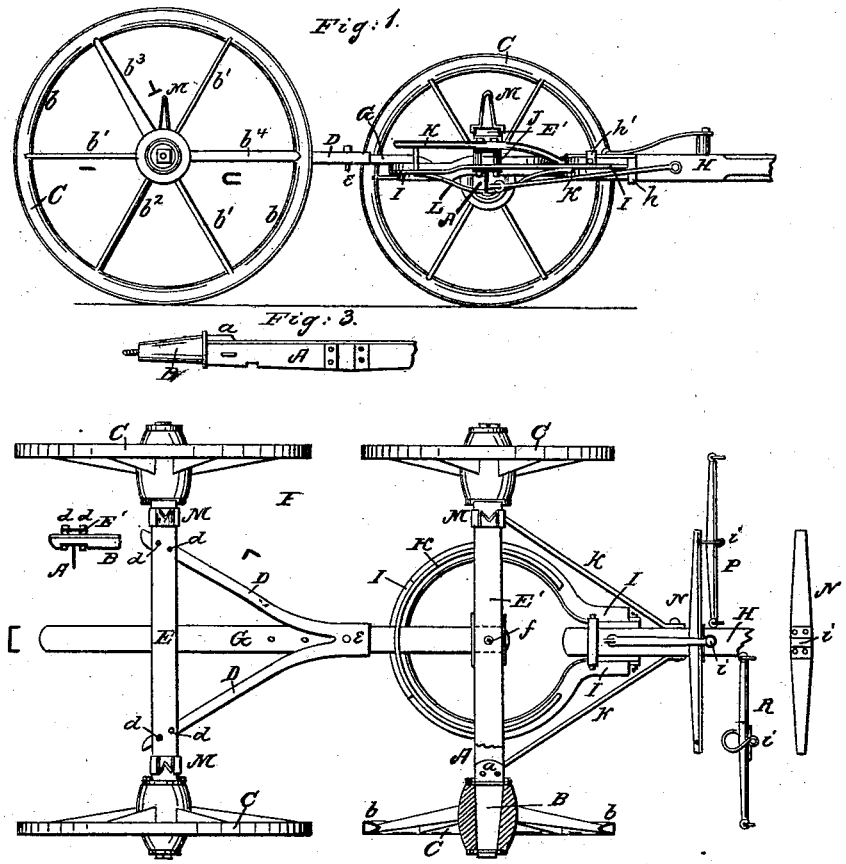

United States Patent Office.

EPHRAIM BALL, JR., OF CANTON, OHIO.

Letters Patent No. 110,107, dated December 13, 1870.

IMPROVEMENT IN WAGONS.

The Schedule referred to in these Letters Patent and making part of the same.

*To all whom it may concern:*

Be it known that I, EPHRAIM BALL, Jr., of Canton, in the county of Stark and in the State of Ohio, have invented certain new and useful Improvements in Wagons; and do hereby declare that the following is a full, clear, and exact description thereof, reference being had to the accompanying drawing and to the letters of reference marked thereon forming a part of this specification.

The nature of my invention consists in the construction of the various parts composing a wagon, as will be hereinafter fully set forth.

In order to enable others skilled in the art to which my invention appertains to make and use the same, I will now proceed to describe its construction and operation, referring to the annexed drawing, in which—

Figure 1 is a side view, and
Figure 2, a plan view of my wagon.
Figure 3 is a side view of the axle.

A A represent the front and rear axles, respectively.

These axles are made of T-shaped wrought-iron, and on to their ends are either cast or shrunk the spindles B, with a projection, *a*, or flange extending on top of the axle for a suitable distance and riveted to the same.

On the spindles B B are placed the wheels *c c*, made entirely of iron, the felly *b* being made hollow, as shown in fig. 2, and the spokes $b^1$, $b^2$, $b^3$, and $b^4$, of different construction.

The spokes $b^1$ consist merely of a straight bar of iron;

The spoke $b^2$ is formed oval of solid iron;

The spoke $b^3$ is T-shaped; and

The spoke $b^4$ of U-shaped iron.

Either of these different forms of spokes may be used. They are all light, and still impart great strength and durability to the wheel.

The rear hounds D D are formed of L-shape iron, connected together at their front ends, or made of one piece, split, so as to form the L-shaped hounds.

The rear ends of these hounds are cut out, as shown in fig. 2, and the axle A inserted through the same.

Then, when the bolster E is placed on top of the same, the bolster is firmly secured to the axle by bolts *d d*, which at the same time hold the hounds firmly in their places.

The reach G is formed of iron, with edges turned down, and passes through the connected front ends of the rear hounds, which are of the same shape and fastened at any point desired by means of a bolt or pin, *e*.

The front hounds I are formed of T-shaped iron, bent in almost circular shape, and cut out similar to the rear hounds D, for the front axle to be inserted.

The front ends of the hounds I are bent forward, as shown in fig. 2, and the tongue H inserted between them.

On top of the front hounds I, above and parallel with the front axle, is placed the head-block J, formed of similarly-shaped iron as the reach G, the front end of said reach being inserted between the front axle and the head-block, and pivoted by means of the king-bolt *f*.

On top of the head-block J is placed the fifth wheel K, which runs parallel with that portion of the front hounds in rear of the front axle.

Underneath the front axle, at each end, is a brace, L, running both in front and rear of the same, and attached to the hounds I, for the purpose of strengthening the same.

The fifth wheel K, head-block J, hounds I, and front axle, are all secured together by bolts, as shown in fig. 1.

The rear bolster E and the front one, E', are both made of iron, bent in the same shape as shown and described for the reach G, the front bolster being pivoted on the center of the head-block J by means of the king-bolt *f*.

The standards M on the bolsters are made, as shown in fig. 1, of iron, bent in such a form that they will not only rest upon the top or upper side of the bolsters, but also grasp their sides or edges, where they are fastened by rivets.

The tongue H is, as above mentioned, inserted between the ends of the front hounds I, and rests upon a band, *h*, underneath, at the ends of said hounds; and its rear end bears against a similar band, *h'*, on top of the hounds.

The double-tree N, single-tree P, and neck-yoke R, are all made of T-shaped iron, with a socket or loop, *i*, formed in the center, through which the connection is to be made.

In rear of the point where the double-tree N is attached to the tongue H the tongue is connected with the front axle by means of a brace-rod, *k*, on each side.

Having thus fully described my invention,

What I claim as new, and desire to secure by Letters Patent, is—

1. The rear hounds D D, constructed of L-shaped iron, and attached to the rear axle, substantially in the manner herein set forth.

2. The front hounds I, constructed, as described, of T-shaped iron, and attached to the front axle, substantially in the manner herein set forth.

3. The standards M, constructed as described, and fastened to the bolsters E E, substantially as set forth.

4. A double or single-tree, made of T-shaped iron, with a loop or socket, $i$, in the center, substantially as set forth.

In testimony that I claim the foregoing, I have hereunto set my hand this 23d day of August, 1870.

EPHRAIM BALL, Jr.

Witnesses:
 W. W. CLARK,
 JOHN BALL, Jr.